April 3, 1956 — C. G. SEXE ET AL — 2,740,823
PRIMARY BATTERY
Filed Oct. 25, 1952 — 2 Sheets-Sheet 1

Inventors
Daniel C. Oakley
and Carrol G. Sexe
By Beale and Jones
Attorneys

April 3, 1956   C. G. SEXE ET AL   2,740,823
PRIMARY BATTERY
Filed Oct. 25, 1952   2 Sheets-Sheet 2
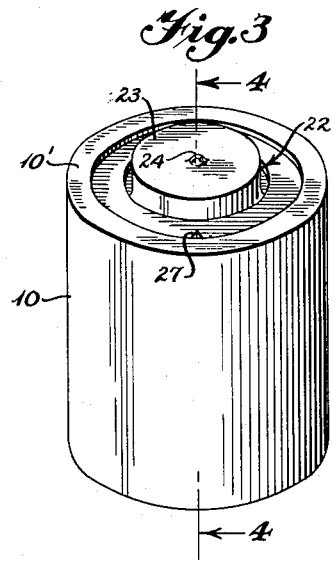
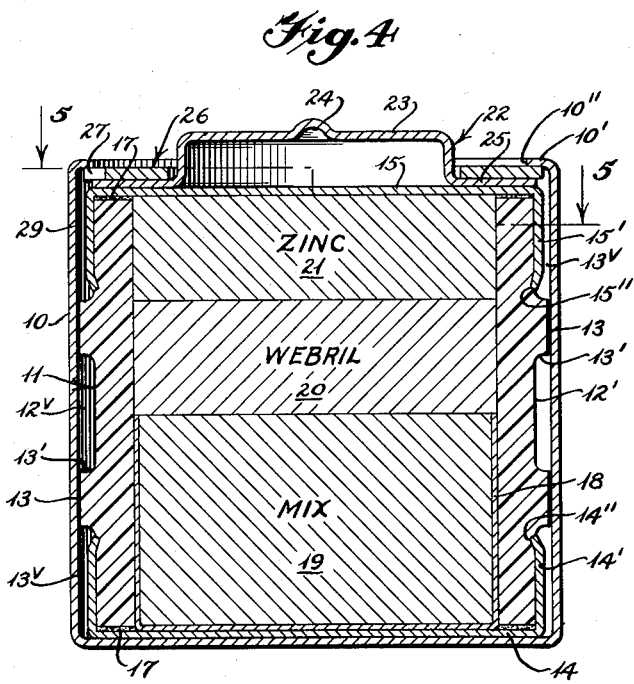
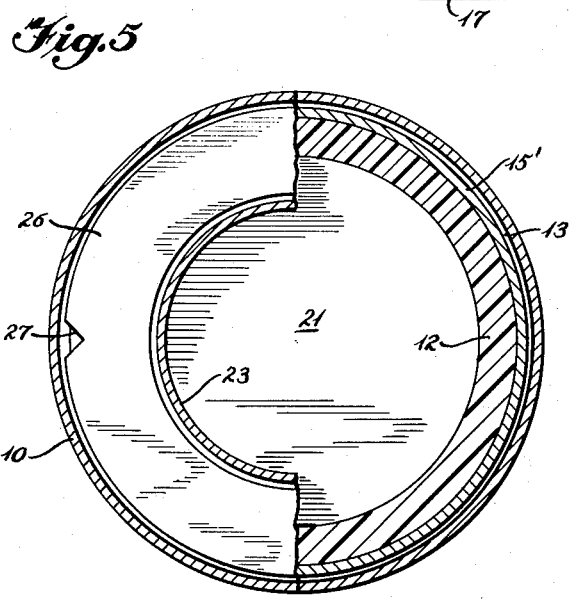
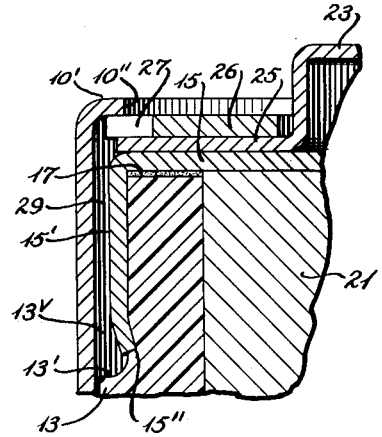
Inventors
Daniel C. Oakley
and Carrol G. Sexe
By Beale and Jones
Attorneys United States Patent Office 2,740,823
Patented Apr. 3, 1956

2,740,823

PRIMARY BATTERY

Carrol G. Sexe and Daniel C. Oakley, Madison, Wis., assignors to Ray-O-Vac Company, Madison, Wis., a corporation of Wisconsin Application October 25, 1952, Serial No. 316,902

7 Claims. (Cl. 136—133)

This invention relates to improvements in primary batteries and particularly to tightly housing cells in an outer enclosure and providing for adequate venting of the enclosed cells.

While various types of cells may be housed in a metallic can-like container according to my invention, it is particularly advantageous for housing a cell which utilizes an alkaline electrolyte and wherein the cell units are relatively small and have cell terminals that are substantially symmetrical with respect to each other. A cell of the alkaline type that is particularly adaptable for use in the housing according to my invention is that disclosed in U. S. application of William S. Herbert, Serial Number 103,593, filed July 8, 1949. More particularly, such suitable cells may have current producing elements that are housed within an insulating cylindrical-like sleeve or spool which has terminal caps crimped over the sleeve at each end.

In such alkaline cells, the alkaline electrolyte is corrosive and, particularly where the electrolyte is concentrated, has the property of absorbing moisture from its surroundings, a typical property of caustic solutions. The alkaline electrolyte is also prone to creep. Moreover, most types of cells which utilize an alkaline electrolyte have the characteristic of liberating hydrogen within the cell after and therefore venting of the cell is advantageous.

It is an object of my invention to provide a battery which has a cell or cells housed within a metal container such that a void space is created between the wall of the cell and the inner wall of the container to accommodate any leakage from within the cell.

A further object of my invention is to provide a housing for a cell of the symmetrical terminal, capped end type so that a compressive force is provided by the housing affording an increase of compressive force between the terminal caps, the sealing material between the terminal caps and the insulating sleeve or spool of the cells, and the ends of the sleeves on which the terminal caps are mounted thus improving the resistance to leakage.

Another object of the invention is to provide a primary battery assembly in which a cell is enclosed within an outer container such that the cell may be fully assembled and electrically tested before being housed in its container.

A still further operation of my invention is to provide in a primary battery a gas vent which is simple in construction yet affords positive operation.

Still further objects and the entire scope of applicability of the present invention will become apparent from the detailed description given hereinafter; it should be understood, however, that the detailed description and specific example is given by way of illustration only and, while indicating preferred embodiments of the invention, is not given by way of limitation, since various changes and modifications within the spirit and scope of the invention will become apparent to those skilled in the art from this detailed description.

For a more complete understanding of the nature and scope of my invention reference can be had to the following detailed description taken in connection with the accompanying drawings in which:

Fig. 3 is a complete battery according to my invention depicting the end terminal element, the insulating washer with its slotted vent and the can container having its open end crimped over the insulating washer;

Fig. 4 is a sectional view along line 4—4 of Fig. 3;

Fig. 5 is a sectional view along line 5—5 of Fig. 4; and

Figure 1:
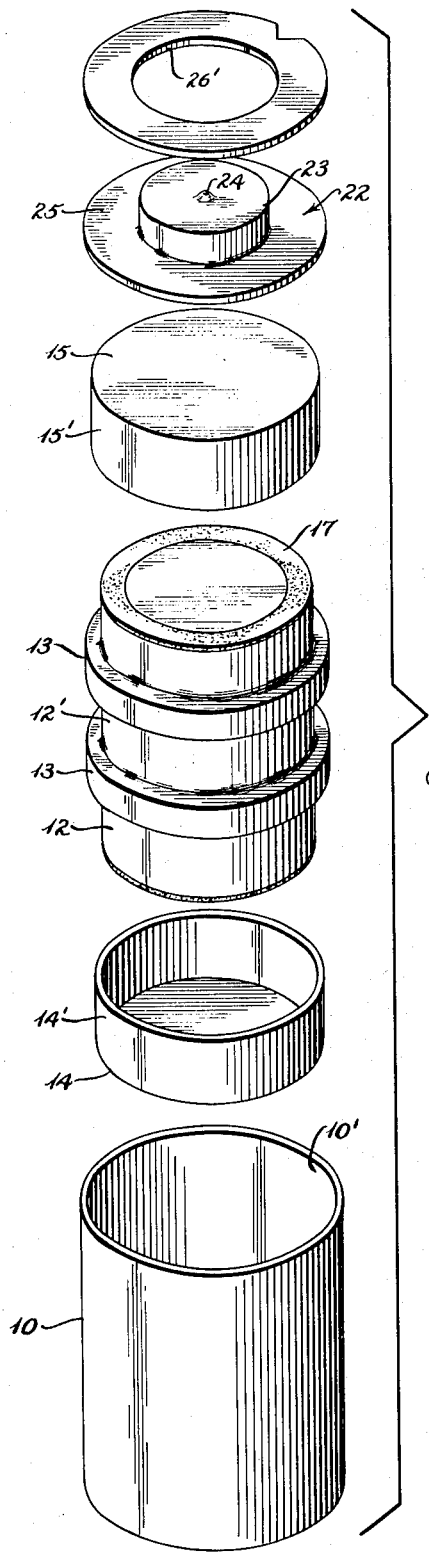
Fig. 1 is an exploded perspective view of the elements making up the battery.

Fig. 6 is an enlarged fragmentary cross-sectional view of the open end of the container showing the vent slot in the insulating washer showing its communication between the cell and the container to the void space intermediate the cell and the outer container and the annular bosses on the insulating cylindrical sleeve of the cell, spacing the upper terminal end of the cell from the surrounding side wall of the container yet providing a gas vent path past the bosses.

Throughout the various views like reference numerals refer to similar elements.

Figure 2:
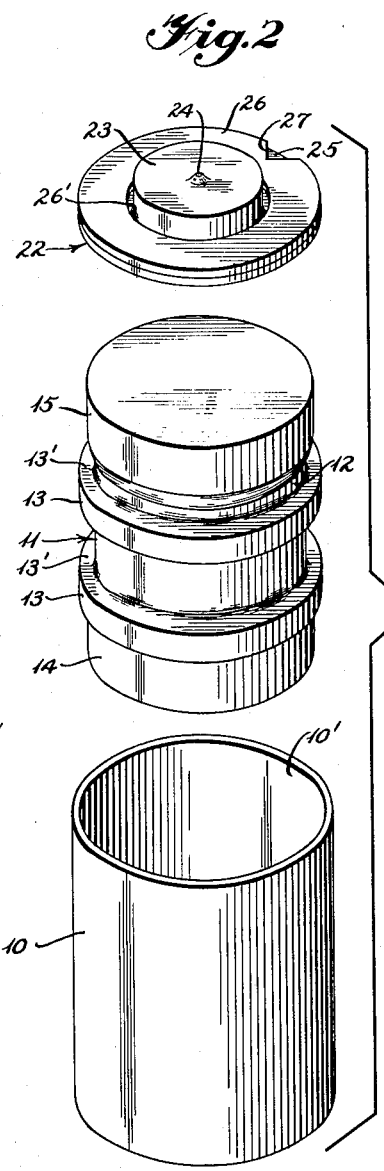
Fig. 2 is an exploded perspective view showing the metallic can outer container, a cell with crimped over terminal capped ends, the terminal element and insulating washer for mounting against the top cap of the cell at the open end of the container.

Referring to Fig. 1 according to my invention there is provided a metal can 10 of cylindrical shape having an open end 10'. The can 10 serves as an outer container for housing the inner cell or cells, such as appear assembled at 11 in Fig. 2. The can or container 10 is preferably of nickel plated steel stock, which is about .01 inch thick, is resistant to alkaline corrosion and is rigid.

The cell generally indicated at 11 is of the alkaline electrolyte type, similar to the type described in the U. S. application of William S. Herbert, Serial Number 103,593, filed July 8, 1949. This cell will be briefly described.

The cell 11 is housed in an insulating sleeve or spool 12 of generally cylindrical configuration and is of such material as polystyrene which is resistant to the alkaline electrolyte and yet is rigid and resistant to deformation under suitable sealing pressures to which the ends of the cell are subjected. The sleeve 12 is formed with radial outwardly extending bosses 13 spaced from each end which project outward beyond the intermediate section 12' of the sleeve 12 and have shoulders 13' disposed facing each other and adjacent the intermediate section 12' therebetween. These annular bosses are spaced in from each end of sleeve 11 and form annular void spaces 13v—13v between the surrounding side wall of the can 10 and the sleeve 12 at each end of the battery. An intermediate annular void space 12v is also formed between the intermediate section 12' of the sleeve, the surrounding wall of the can 10 and the shoulders 13' on bosses 13. The void spaces 12v and 13v provide a space to receive any creepage of material from within the cell that might leak by the sealed ends of the cell. The bosses 13—13 are of such diameter that they center the cell 11 in can 10 yet provide for slight spacing from the surrounding can for the passage of gas thereby so that gas may vent to the open end of the can as will be hereinafter described. The bosses 13—13 also space the cell 11 within the can 10 so that the upper terminal end is spaced and insulated from the surrounding metal can enclosure. The ends of the cell 11 are closed by terminal caps 14 and 15 which are shown as cup shaped caps in Fig. 1 before being assembled over the ends of the sleeve 12 which houses the current producing elements of the cell.

Each terminal cap 14 and 15 has a side wall or skirt 14' and 15' whose ends 14" and 15" are crimped into biting engagement with the side wall of the sleeve 12 as best shown in Figures 4 and 6. It will be observed that the inside edge of the ridge 14''' and 15''' on the caps is sharp and bites into the wall of the plastic sleeve 12. The cap 14 is a positive end terminal cap and may be of plain steel, or stainless steel having a chromium content, or of nickel plated steel and having the characteristic of strength and rigidity. The cap 15 is the negative terminal cap and may be of steel or tin plated steel such that it is compatible with the zinc negative electrode which is pressed thereagainst.

In assembling the caps 14 and 15 over the ends of the spool or sleeve 12, sealing rings or gaskets 17 are first placed over the ends of the sleeve. These gaskets are of annular shape and fit the flat ends of the spool. The sealing gaskets 17 are of plastic material which is resistant to attack by the cell electrolyte yet is sufficiently pliable to form a tight seal at the capped ends thereby affording a high resistance to leakage past the capped terminal ends of the cell.

Reference to Figures 4 and 6 shows the interior electrical current producing elements of the cell. The positive end is at the lower end in Fig. 4 and includes a steel can 18 in which is compacted a depolarizer mix 19 preferably in pellet form. The depolarizer mix 19 is preferably formed of an intimate mixture of finely divided manganese dioxide and graphite. Disposed above the depolarizer mix 19 is an electrolyte carrier 20 of porous material or cotton fibers as "Webril" which serves as the electrolyte carrier. Webril is an alkali-resistant cellulosic matt, as described in Patent No. 2,650,945, issued to W. S. Herbert, at column 14, lines 66 to 68. The electrolyte may be a gelled material. Preferably, however, the porous "Webril" is employed which is capable of absorbing and holding the electrolyte, which is not shown in the drawings. The electrolyte is essentially a water solution of an alkaline hydroxide, preferably sodium or potassium. The electrolyte solution may be modified by adding zinc oxide, dissolved in the electrolyte as zincate.

The negative element 21 of the cell is disposed opposite to the positive end and may take several different forms amongst which are a zinc wafer, a plurality of zinc discs, or zinc amalgamated with mercury.

Referring again to Fig. 1 there is depicted an end terminal element generally indicated at 22 fabricated from metal stock such as nickel plated steel. The terminal element 22 is of disc-like shape having a diameter just slightly less than the diameter of the cell terminal cap 15 on which it abuts and makes electrical contact over a broad surface as shown assembled in Figures 4 and 6. The terminal element 22 has a struck-up portion 23 in the center portion thereof that is cylindrical in shape and this latter portion 23 has a further struck-up projecting contact portion 24 in the center thereof. The terminal element 22 is thus formed with a flat disc-like portion 25 which seats in abutting electrical engagement with the top surface of the terminal cap 15 throughout a relatively broad contact area. The struck-up portion 23 of the terminal element 22 when assembled in the battery, as shown in Fig. 3, projects beyond the open end of the can enclosure 10 and is fully insulated therefrom. Mounted on the top of the terminal element 22 is an insulating washer 26 shown apertured at 26' which is received over the struck-up projecting boss 23 on the terminal element 22. The washer 26 has a diameter slightly greater than that of the terminal element 22 which has a diameter substantially equal to the diameter of the terminal cap 15 on the cell unit 11. The insulating washer 26 is formed with a small V-shaped slot 27 extending in from the peripheral edge thereof which serves as a gas vent passage leading to the interior of the battery which is hereinafter more fully explained. The slot 27 may take other shapes so long as it extends in from the peripheral edge a sufficient distance to present a portion thereof opening to the atmosphere adjacent the crimped over top edge portion 10' of the enclosure can 10 under which it lies, as best shown in Fig. 3.

In the make up of the cell 11 and its terminal caps 14 and 15, the diameter of the terminal caps 14 and 15 after crimping them over the ends of sleeve 12 is substantially less than the inside diameter of the can enclosure 10 as best illustrated in Figures 4 and 6. So also the diameter of the terminal element 22 is less than the diameter of the can thereby electrically insulating them from the metallic can 10 which is positive as compared to the upper negative end of the battery. There is also shown in Figures 4 and 6 a gas passageway from the lower end of the cell, past the bosses 13—13 and the top end of the cell through the vent slot 27 to the atmosphere.

The cells 11 are assembled complete and may be age tested for leakage and given an electrical test before assembly within their outer housings 10. This feature is particularly advantageous as only good cells will be made up into battery assemblies and both time and material savings may be effected.

Referring to Figures 4 and 6, it will be observed that the positive terminal cap 14 rests in broad surface contact with the inside bottom surface of can 10 and thus the metallic can 10 is a positive terminal. The upper negative end of the cell, as at the terminal cap 15, must therefore be insulated from the walls of can 10. So also the terminal element 22 which is the negative terminal element must also be electrically insulated from the can 10 and this insulating is accomplished by the air gap spacing heretofore described. In the assembly there is left an annular air space indicated at 29 about the skirt 15' of cap 15 which leads downward along the inside wall of can 10 past the skirted portion 15' of terminal cap 15 into communication with void spaces 13v, 12v and 13v. Any creepage of material that may occur from the active elements within cell 11 can accumulate in these void spaces 12v and 13v. Any gas that may occur from the cell will pass through these annular void spaces out through the annular passage 29 thence through the vent slot 27 at the open end of can 10 and thence to the atmosphere.

As was pointed out heretofore the upper end of the can 10 is crimped over the ends of the sleeve 12 and holds the gasket 17 in tight engagement with the extreme end faces of the sleeve 12. This crimping action at the open end 10' of the can 10 places the ends of the cell 11 under compression while the side of the metal can 10 between the ends is under tension. This compressive action affords additional compression to the terminal cap ends 14 and 15 of the cell 11. Thus, in addition to the sealing action of the crimped on terminal caps 14 and 15 against the sealing gaskets 17 on the ends of the insulating sleeve 12, further compressive sealing force is applied by the compressive force acting at the ends of the can 10. This compressive force at the ends of can 10 also holds the terminal element 23 in electrical contact with the top surface of top terminal cap 14 and the surface of bottom terminal cap 15 in electrical contact with the inside bottom surface of the can 10.

Referring again to the vent slot 27 in the insulating washer 26, as shown in Figures 3, 4 and 6, it is essential to the operation of this simple venting of the cell at the open end of the battery that a portion of the slot 27 extend inward beyond the inner peripheral edge 10" on the crimped over end 10' of the can 10. The slot 27 need not be V-shaped as pointed out heretofore as other shapes would equally as well provide a gas vent opening through the insulating washer.

A similar cell structure is described in the copending application of Carrol G. Sexe, Ser. No. 316,848, filed October 25, 1952.

Having thus described our invention we desire to secure Letters Patent and claim:

1. A dry battery comprising at least a single cell, and a metal can container open at one end enclosing said cell including means applying compression to said cell, said cell comprising an insulating sleeve having bosses spaced from each end and extending radially outward beyond the side of the sleeve in close spaced relation to the inner wall surface of the can thereby providing void spaces for gas collection above and below said bosses and between said container and sleeve, electrical energy producing elements within said sleeve and metallic closure terminal caps for the ends of the sleeve, said caps having skirt portions extending over the ends and secured to the side walls of the sleeve by crimping engagement, a terminal element abutting one of said terminal caps at the open end of said container and having a portion thereof protruding beyond the open end of said container, said skirt on the terminal caps and the peripheral edge of said terminal element being spaced from the surrounding wall of said can, and an insulating washer having an aperture therethrough mounted over said terminal element with said protruding portion of said terminal element projecting through the aperture in said washer, said washer having a vent slot extending inward from the periphery thereof, said open end of the container being crimped over the adjacent peripheral portion of said insulating washer and said vent slot in said insulating washer extending inward therein beyond the crimped over end of said container, whereby said slot provides a vent for said void spaces around said enclosed cell and said crimped over end of the container holds said cell under compression.

2. A dry battery comprising at least a single cell, and a metal can container open at one end enclosing said cell including a portion under tension alongside said cell and portions connected thereto bearing against the ends of said cell to apply compression to said cell, said cell comprising an insulating sleeve having bosses spaced from each end extending radially outward beyond the side of the sleeve in close spaced relation to the inner wall surface of the can thereby providing void spaces for gas collection above and below said boss and between said container and sleeve, electrical energy producing elements within said sleeve and metallic closure terminal caps for the ends of the sleeve, said caps having skirt portions extending over the ends and secured to the side wall of the sleeve, a terminal element abutting one of said terminal caps at the open end of said container and having a portion thereof protruding beyond the open end of said container, said skirt on the terminal caps and the peripheral edges of said terminal element being spaced from the surrounding wall of said can, and an insulating washer having an aperture therethrough mounted over said terminal element with said protruding portion of said terminal element projecting through the aperture in said washer, said washer having a vent slot extending inward from the periphery thereof, said open end of the container being crimped over the adjacent peripheral portion of said insulating washer and said vent slot in said washer extending inward therein beyond the crimped over end of said container, whereby said cell is vented and held under compression.

3. A dry battery comprising a cell, and a cylindrical metal can open at one end enclosing said cell including a portion under tension alongside said cell and portions connected thereto bearing against the ends of said cell to apply compression to said cell, said cell comprising a cylindrical insulating sleeve having bosses spaced from each end extending radially outward beyond the side of the sleeve in close spaced relation to the inner wall surface of the can thereby providing a void space for gas collection above and below said bosses and between said can and sleeve, electrical energy producing elements within said sleeve and metallic closure terminal caps for the ends of the sleeve and in contact with the electrical elements therein, said caps having skirt portions extending over the ends of said sleeve, the end portion of the skirts being crimped into biting engagement with the side wall of said sleeve, a terminal element having a circular disc-like shape provided with a dished out cylindrical terminal portion, said terminal element being mounted in abutting contact on said terminal cap at the open end of the can and having the dished out terminal portion thereof projecting beyond the open end of said can, said skirt on the terminal caps and the peripheral edge of said terminal element being spaced from the surrounding wall of said can, and a circular shaped insulating washer having a central aperture received over said terminal element and having a vent slot projecting therein from the periphery thereof, said can being crimped over said insulating washer and holding the washer, terminal element and enclosed cell under compression, said slot in the insulating washer extending into the washer beyond the crimp-over portions of said can thereby creating a vent from said void space around said enclosed cell to the open end of said can.

4. A dry battery of the character described in claim 2 wherein the electrical current producing elements within said cell include a zinc anode in contact with one of the terminal caps, a cathode consisting of an intimate mixture of finely divided manganese dioxide and graphite housed with a container in contact with the other terminal cap and an alkaline electrolyte disposed in a carrier positioned in contact with and intermediate said anode and cathode.

5. In a structure comprising an outer cylindrical metallic container closed at one end and open at the other end, said container enclosing a cylindrical dry cell which has a substantially cylindrical outer sleeve of dielectric material surrounding the active cell components, said dry cell having substantially flat end terminals, the sidewalls of said container at its open end being crimped over a substantially flat cell end terminal but being separated and insulated therefrom by an insulating member, the improvement comprising providing said dielectric sleeve with a peripheral projection engaging the inner wall of the container and spacing the sleeve therefrom, and providing said insulating member with an aperture interconnecting the space between the sleeve and container with the exterior of the structure.

6. The structure of claim 5 in which the peripheral projection comprises at least one boss projecting from the sleeve for a distance greater than the maximum radius of the cell end terminals.

7. The structure of claim 6 in which the peripheral projection comprises a plurality of annular bosses which are spaced from each other and from the ends of the sleeves.

References Cited in the file of this patent

UNITED STATES PATENTS

| Number | Name | Date |
|---|---|---|
| 1,137,030 | Smith | Apr. 27, 1915 |
| 1,500,477 | Warncke | July 8, 1924 |
| 1,549,851 | Benner | Aug. 18, 1925 |
| 2,445,005 | Schmelzer | July 13, 1948 |
| 2,482,514 | Ruben | Sept. 20, 1949 |
| 2,490,598 | Oliver | Dec. 6, 1949 |
| 2,526,101 | West, Jr., et al. | Oct. 17, 1950 |
| 2,571,616 | Ruben | Oct. 16, 1951 |
| 2,582,973 | Ellis | Jan. 22, 1952 |
| 2,601,267 | Ellis | June 24, 1952 |
| 2,636,062 | Cotton | Apr. 21, 1953 |